United States Patent
Graziosi et al.

(10) Patent No.: US 12,505,578 B2
(45) Date of Patent: Dec. 23, 2025

(54) PATCH MESH CONNECTIVITY CODING

(71) Applicants: SONY GROUP CORPORATION, Tokyo (JP); Sony Corporation of America, New York, NY (US)

(72) Inventors: Danillo Graziosi, Flagstaff, AZ (US); Alexandre Zaghetto, San Jose, CA (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 477 days.

(21) Appl. No.: 17/987,833

(22) Filed: Nov. 15, 2022

(65) Prior Publication Data
US 2023/0306642 A1 Sep. 28, 2023

Related U.S. Application Data

(60) Provisional application No. 63/269,905, filed on Mar. 25, 2022.

(51) Int. Cl.
*G06T 9/00* (2006.01)

(52) U.S. Cl.
CPC .................... *G06T 9/001* (2013.01)

(58) Field of Classification Search
None
See application file for complete search history.

(56) References Cited

U.S. PATENT DOCUMENTS 6,438,266 B1   8/2002   Bajaj
9,734,595 B2 * 8/2017   Lukac ............ G06T 9/00
(Continued)

FOREIGN PATENT DOCUMENTS

JP   2010527523 A   8/2010
JP   2024509605 A   3/2024
(Continued)

OTHER PUBLICATIONS

Danillo Graziosi (Sony) et al: "[V-PCC] [E:e:2.6-related] Mesh Patch Data", 132 . MPEG Meeting; Oct. 12, 2020-Oct. 16, 2020; Online; (Motion Picture Expert Group or ISO/IEC JTC1/SC29/WG11), No. m55368 Oct. 7, 2020 (Oct. 7, 2020) , XP030292889.
Danillo Graziosi (Sony) et al: "[V-PCCJ [EE2.6-related] Tracked patch Data", 132. MPEG Meeting; Oct. 12, 2020-Oct. 16, 2020; Online; (Motion Picture Exper'i'group or ISO / IEC JTC1/SC29/WG11), No. m55372 Oct. 7, 2020 (Oct. 7, 2020), XP030292895.
(Continued)

*Primary Examiner* — Anand P Bhatnagar
(74) *Attorney, Agent, or Firm* — Haverstock & Owens, A Law Corporation

(57) ABSTRACT

The connectivity information and mapping information of a mesh surface patch are able to be encoded after projection to 2D. Regarding the connectivity information, the projection operation does not change the connection between vertices, so the same list of connected vertices are able to be carried in the atlas data. Similarly, the mapping information does not change after projection and is able to be carried in the atlas data. Two methods are disclosed for encoding the connectivity and mapping information. For the connectivity information, a video-based method uses neighboring color coding. For mapping coordinates, a method uses the projected vertex position. The connectivity and mapping are also able to be processed by an external mesh encoder. Newly proposed mapping information is able to be taken advantage of to perform temporal compression.

18 Claims, 5 Drawing Sheets

```
ply
format ascii 1.0
element vertex #NUM_VERT
property int x
property int y
property int z
element face #NUM_FACE
property list uchar int vertex_indices
end_header
0 1 0
0 5 0
5 4 0
5 0 0
0 0 0
...
3 0 1 2
3 3 0 2
3 4 0 3
...
```

Adding delta information for z coordinate (geometry correction) and mapping information

```
ply
format ascii 1.0
element vertex #NUM_VERT
property int x
property int y
property int z
property int u
property int v
element face #NUM_FACE
property list uchar int vertex_indices
end_header
0 1 -1 30 45
0 5 0 30 40
5 4 1 40 45
5 0 0 40 45
0 0 0 50 60
...
3 0 1 2
3 3 0 2
3 4 0 3
...
```

(56) References Cited

U.S. PATENT DOCUMENTS

| | | | |
|---|---|---|---|
| 11,373,339 B2* | 6/2022 | Graziosi | G06T 17/205 |
| 11,393,132 B2* | 7/2022 | Faramarzi | G06T 9/001 |
| 11,622,112 B2* | 4/2023 | Rossato | G06T 9/00 |
| | | | 375/240.03 |
| 11,836,953 B2* | 12/2023 | Graziosi | G06T 9/001 |
| 11,908,169 B2* | 2/2024 | Graziosi | H04N 19/597 |
| 12,166,987 B2* | 12/2024 | Rossato | H04N 19/30 |
| 2006/0290695 A1* | 12/2006 | Salomie | G06T 17/20 |
| | | | 345/423 |
| 2009/0046207 A1 | 2/2009 | Salvucci | |
| 2022/0108483 A1* | 4/2022 | Graziosi | H04N 19/597 |
| 2022/0191497 A1* | 6/2022 | Rossato | H04N 19/63 |
| 2023/0107834 A1* | 4/2023 | Zhang | G06T 9/001 |
| | | | 382/232 |
| 2023/0379470 A1* | 11/2023 | Rossato | H04N 19/62 |

FOREIGN PATENT DOCUMENTS

| | | |
|---|---|---|
| WO | WO-2020234509 A1 | 11/2020 |
| WO | WO-2021188238 A1 | 9/2021 |
| WO | WO-2022044818 A1 | 3/2022 |
| WO | WO-2023074673 A1 | 5/2023 |

OTHER PUBLICATIONS

Yangs et al: "View-dependent progressive mesh coding based on partitioning", Visual Communications and Image Processing; Jan. 21, 2002 Jan. 23, 2002; San Jose, Jan. 21, 2002 (Jan. 21, 2002)XP030080523, section 2.2.

\* cited by examiner

○ Vertices having the same 2D position across time
● Boundary vertices

PATCH MESH CONNECTIVITY CODING

CROSS-REFERENCE TO RELATED APPLICATION(S)

This application claims priority under 35 U.S.C. § 119(e) of the U.S. Provisional Patent Application Ser. No. 63/269,905, filed Mar. 25, 2022 and titled, "PATCH MESH CONNECTIVITY CODING," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is nomechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

The connectivity information and mapping information of a mesh surface patch are able to be encoded after projection to 2D. Regarding the connectivity information, the projection operation does not change the connection between vertices, so the same list of connected vertices are able to be carried in the atlas data. Similarly, the mapping information does not change after projection and is able to be carried in the atlas data. Two methods are disclosed for encoding the connectivity and mapping information. For the connectivity information, a video-based method uses neighboring color coding. For mapping coordinates, a method uses the projected vertex position. The connectivity and mapping are also able to be processed by an external mesh encoder. Newly proposed mapping information is able to be taken advantage of to perform temporal compression.

In one aspect, a method of encoding connectivity information and mapping information comprises encoding vertex mapping information including delta information for geometry correction and encoding patch connectivity information, including implementing mesh simplification by fixing positions of vertices in time. The method further comprises sending a flag indicating whether the vertex mapping information is implicitly or explicitly sent. Encoding the vertex information and encoding the patch connectivity information are performed by an external encoder. Encoding the patch connectivity information comprises using color coding in an occupancy map. Using color coding in the occupancy map is limited to a maximum of 4 colors. Encoding vertex mapping information further comprises using rate distortion face transmission. Implementing mesh simplification includes sending only boundary vertices and not sending inner vertices. The inner vertices are determined based on a previous set of inner vertices from a previous frame.

In another aspect, an apparatus comprises a non-transitory memory for storing an application, the application for: encoding vertex mapping information including delta information for geometry correction and encoding patch connectivity information, including implementing mesh simplification by fixing positions of vertices in time and a processor coupled to the memory, the processor configured for processing the application. The application is further configured for sending a flag indicating whether the vertex mapping information is implicitly or explicitly sent. Encoding the vertex information and encoding the patch connectivity information are performed by an external encoder. Encoding the patch connectivity information comprises using color coding in an occupancy map. Using color coding in the occupancy map is limited to a maximum of 4 colors. Encoding vertex mapping information further comprises using rate distortion face transmission. Implementing mesh simplification includes sending only boundary vertices and not sending inner vertices. The inner vertices are determined based on a previous set of inner vertices from a previous frame.

In another aspect, a system comprises one or more cameras for acquiring three dimensional content, an encoder for encoding the three dimensional content: encoding vertex mapping information including delta information for geometry correction and encoding patch connectivity information, including implementing mesh simplification by fixing positions of vertices in time and a decoder for decoding the encoded three dimensional content including: using the delta information for adjusting a mesh, determining inner vertices of the patch connectivity information from previous inner vertices from a previous frame. The encoder is further configured for sending a flag indicating whether the vertex mapping information is implicitly or explicitly sent. Encoding the vertex information and encoding the patch connectivity information are performed by an external encoder. Encoding the patch connectivity information comprises using color coding in an occupancy map. Using color coding in the occupancy map is limited to a maximum of 4 colors. Encoding vertex mapping information further comprises using rate distortion face transmission. Implementing mesh simplification includes sending only boundary vertices and not sending inner vertices.

DETAILED DESCRIPTION OF THE PREFERRED EMBODIMENT

Figure 1:
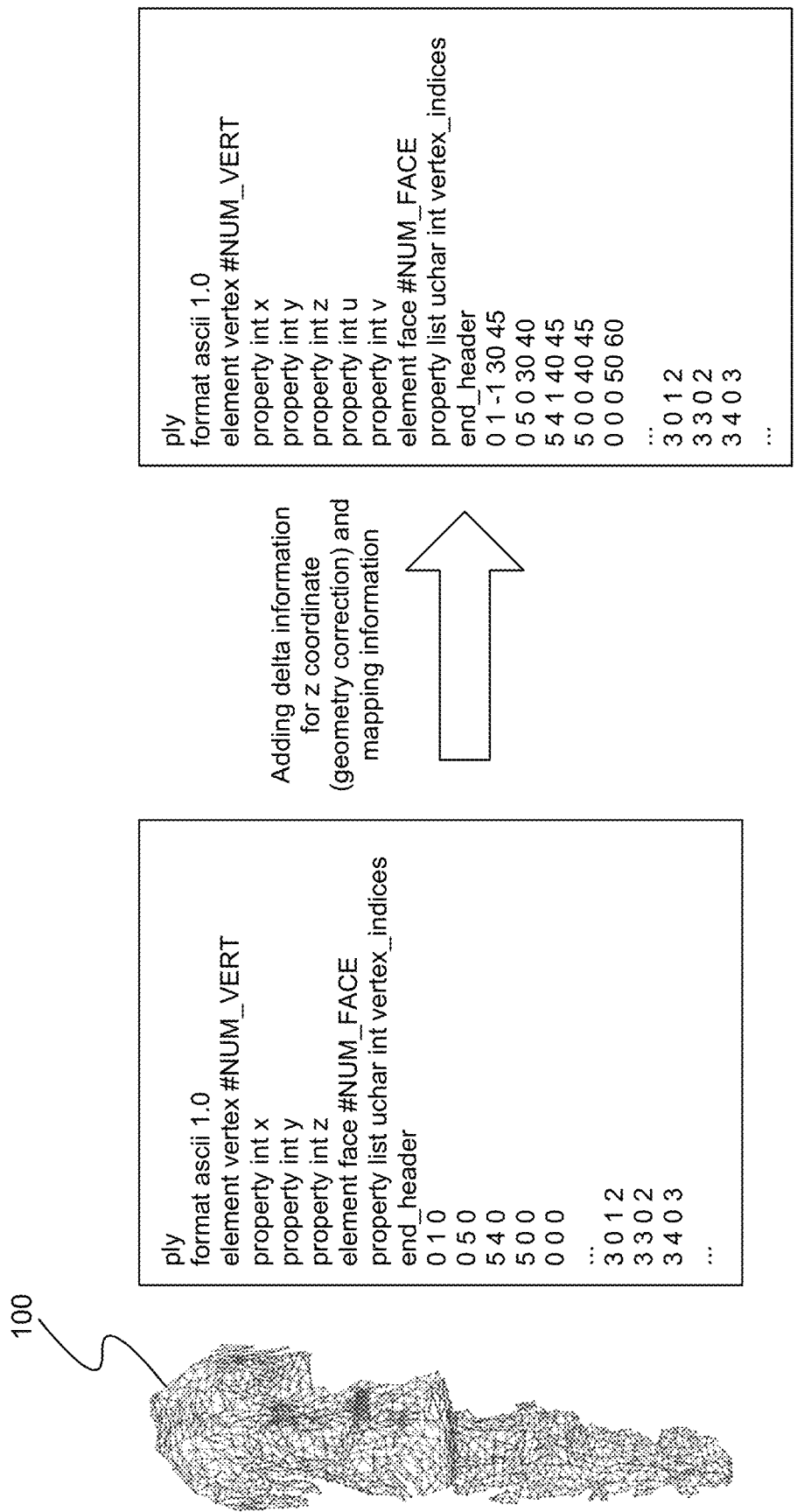
FIG. 1 illustrates a diagram of binary encoding according to some embodiments.

The connectivity information and mapping information of a mesh surface patch are able to be encoded after projection to 2D. Regarding the connectivity information, the projection operation does not change the connection between vertices, so the same list of connected vertices are able to be carried in the atlas data. Similarly, the mapping information does not change after projection and is able to be carried in the atlas data. Two methods are disclosed for encoding the connectivity and mapping information. For the connectivity information, a video-based method uses neighboring color coding. For mapping coordinates, a method uses the projected vertex position. The connectivity and mapping are also able to be processed by an external mesh encoder. Newly proposed mapping information is able to be taken advantage of to perform temporal compression.

The connectivity information indicates which pixels are connected. There are sets of information for a triangle. One set of information is the position of the triangle on the texture map. For each triangle on the texture map there are two sets of information—1) how the vertices are connected in 3D (e.g., in a connectivity list) and 2) vertex mapping information.

There are three ways of encoding vertex mapping information—implicit, explicit, binary. For the implicit implementation, if projecting on a 2D surface, then the projection is the same as the mapping. For example, the place hit when projecting on the projection surface is the UV coordinate. For the explicit implementation, even though projection is performed, a different coordinate is sent for the texture. For the binary implementation, the explicit information is encoded with an external encoder (e.g., Draco or AFX).

An updated syntax for the explicit implementation is shown:

AtlasPatch2dPosX=mpdu_vertex_pos_x[tileID][patchIdx][I]
AtlasPatch2dPosY=mpdu_vertex_pos_y[tileID][patchIdx][I]
if (asps_mesh_uv_coordinates_present_flag)
  mappingU=(mpdu_vertex_u_coord[tileID][patchIdx][i])/$2^{asps\_mesh\_coordinates\_bit\_depth\_minus1+1}-1$
  mappingV=(mpdu_vertex_v_coord[tileID][patchIdx][i])/$2^{asps-meshcoordinates\_bit\_depth\_minus1+1}-1$
else
  mappingU=AtlasPatch2dPosX
  mappingV=AtlasPatch2dPosY A flag is able to be sent to indicate whether the vertex mapping information is implicitly or explicitly sent. If the information is explicitly sent, the value is scaled by a bit depth.

If binary coding is implemented, an external mesh encoder is able to be used to encode the patch mesh information. U and V are added on the ply, and the vertex mapping information is encoded with the ply. In some embodiments, delta information for the z coordinate is added. The delta information is able to be used for geometry correction.

There are many ways of encoding patch connectivity information. For the explicit implementation, it is indicated in the syntax which pixels are connected, so the list of pixel connectivity is sent in the patch. For the binary implementation, an external encoder is able to be utilized. In another implementation, mesh simplification is able to be performed by fixing the position of the vertices across time. In a color coding implementation, color coding using an occupancy map is implemented. The triangles are able to be mapped using only four colors. In another implementation, Rate Distortion (RD) face transmission is utilized.

FIG. 1 illustrates a diagram of binary encoding according to some embodiments. The geometry image is used to generate the map 100. There is still some information that may be modified by video encoding. By explicitly sending the delta information to an external encoder, the binary image is able to be generated while correcting errors from video transmission. The UV coordinates are also sent which helps with the video compression. In some embodiments, an external mesh encoder is used to encode the patch mesh information.

Figure 2:
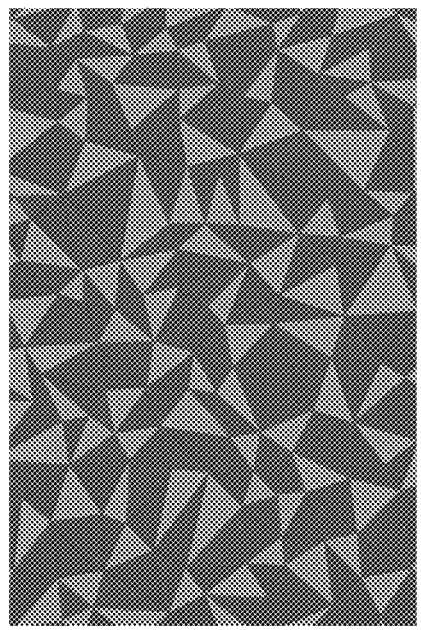
FIG. 2 illustrates a diagram of color coding using an occupancy map according to some embodiments.

FIG. 2 illustrates a diagram of color coding using an occupancy map according to some embodiments. Mapping of triangle indices is able to use only 4 colors. Since the figure is in grayscale, it may be difficult to distinguish some of the colors, edges and vertices, but only 4 colors are used, and a triangle of one color does not share an edge with a triangle of the same color. The connectivity information is added in the occupancy map using the luminance channel only (4 colors→(0,0,0), (64,0,0), (128,0,0), (255,0,0)). Additional details regarding color coding and mesh compression are able to be found in U.S. patent application Ser. No. 17/322,662, filed May 17, 2021, titled "VIDEO BASED MESH COMPRESSION," U.S. Provisional Patent Application Ser. No. 63/088,705, filed Oct. 7, 2020 and titled, "VIDEO BASED MESH COMPRESSION" and U.S. Provisional Patent Application Ser. No. 63/087,958, filed Oct. 6, 2020 and titled, "VIDEO BASED MESH COMPRESSION," which are all hereby incorporated by reference in their entireties for all purposes. The 3D mesh or 2D patch mesh connectivity are able to be encoded using an occupancy map and exploiting temporal correlation utilizing the video based mesh compression. Additionally, vertices are able to be detected using the color map 200, where the intersection of triangles are able to be detected based on the colors.

Figure 3:
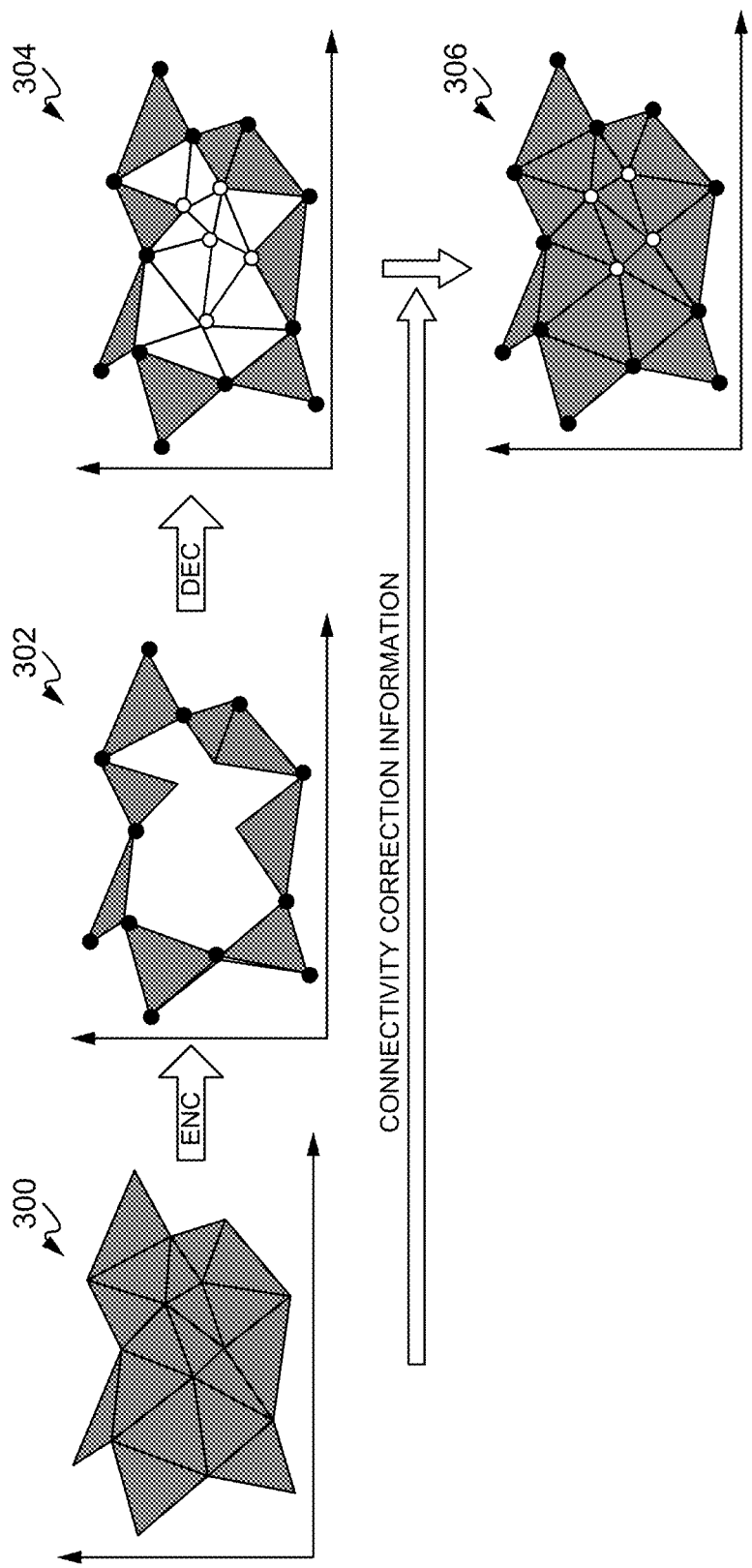
FIG. 3 illustrates a diagram of RD face transmission according to some embodiments.

FIG. 3 illustrates a diagram of RD face transmission according to some embodiments. A mesh is received/acquired 300. The mesh connectivity points are encoded by the encoder 302. On the decoder side, the mesh is reconstructed 304, but the positions of the points may be slightly different than the original mesh. Correction information (e.g., delta information) is sent to the decoder, so the decoder is able to adjust the mesh 306 so that it is more accurate compared to the original mesh.

The vertices of an input mesh are V-PCC encoded and locally decoded. The encoder generates a mesh from a decoded point cloud. The encoder compares the generated face/connectivity information versus the original information. The encoder signals the non-matching faces incorporating rate/distortion tradeoffs. The decoder uses V-PCC to decode the mesh vertices and generate a mesh from the decoded vertices. The decoder uses the signaled non-matched faces to modify the mesh. In some embodiments, instead of 3D, one is also able to apply a similar approach to code the UV coordinates and their connectivity using a 2D triangulation approach.

Figure 4:
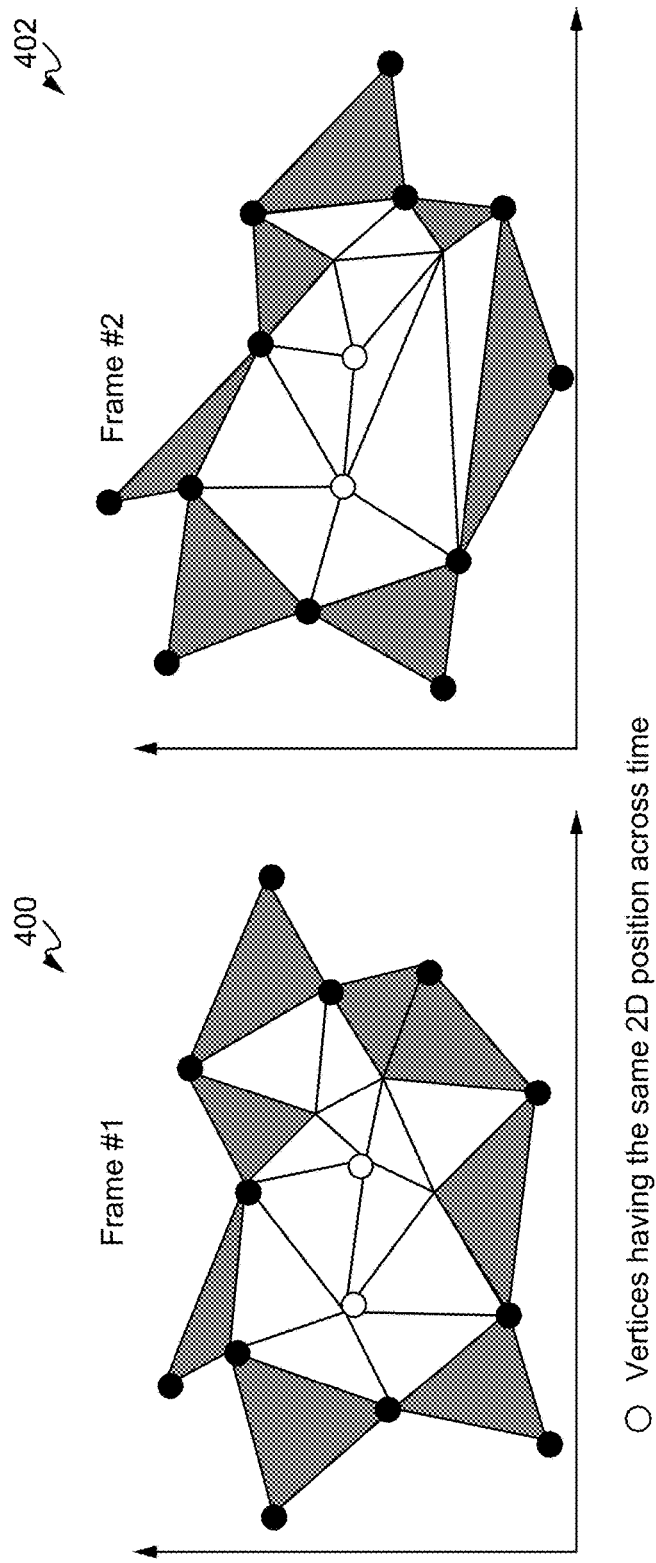
FIG. 4 illustrates a diagram of temporal stability in mesh connectivity according to some embodiments.

FIG. 4 illustrates a diagram of temporal stability in mesh connectivity according to some embodiments. When a patch is sent, only the boundary vertices are sent. The inner vertices are not sent. The decoder determines the inner vertices (e.g., based on previous or subsequent frames). For example, the inner vertices from patch 400 in frame 1 are used as the inner vertices for patch 402 in frame 2. In some embodiments, a first set of inner vertices are sent (e.g., for frame 0 or frame 1), so that future frames have inner vertices from a prior frame to use. The decoder is able to re-generated the triangles from the boundary vertices and the inner vertices. Even if the patch is rotating from frame to frame, the same inner points are able to be used. The inner triangles may be slightly different because of the rotation, but that is acceptable. By not sending the inner vertices, fewer bits are sent.

Figure 5:
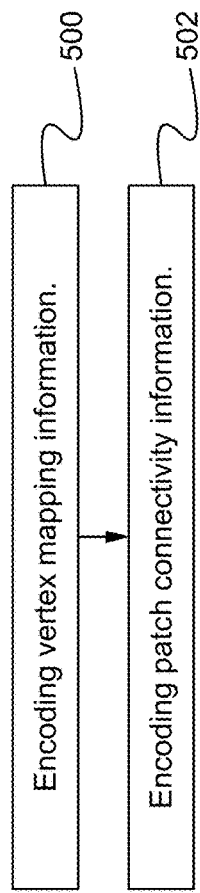
FIG. 5 illustrates a flowchart of a method of patch mesh connectivity coding according to some embodiments.

FIG. 5 illustrates a flowchart of a method of patch mesh connectivity coding according to some embodiments. In the step 500, vertex mapping information is encoded. Delta information is able to be included with the vertex mapping information for geometry correction. A flag is able to be sent indicating whether the vertex mapping information is implicitly or explicitly sent. In some embodiments, encoding vertex mapping information uses RD face transmission. In the step 502, patch connectivity information is encoded. Encoding patch connectivity information includes implementing mesh simplification by fixing positions of vertices in time. In some embodiments, mesh simplification includes sending only boundary vertices and not sending inner vertices. The patch connectivity information is able to include color coding in an occupancy map. The color coding is limited to a maximum of 4 colors. In some embodiments, the vertex information and the patch connectivity information are performed by an external encoder. In some embodiments, the order of the steps is modified. In some embodiments, fewer or additional steps are implemented. For example, the encoded information is able to use the delta information to adjust a mesh. In another example, inner vertices of the patch connectivity are able to be determined from previous inner vertices from a previous frame.

Figure 6:
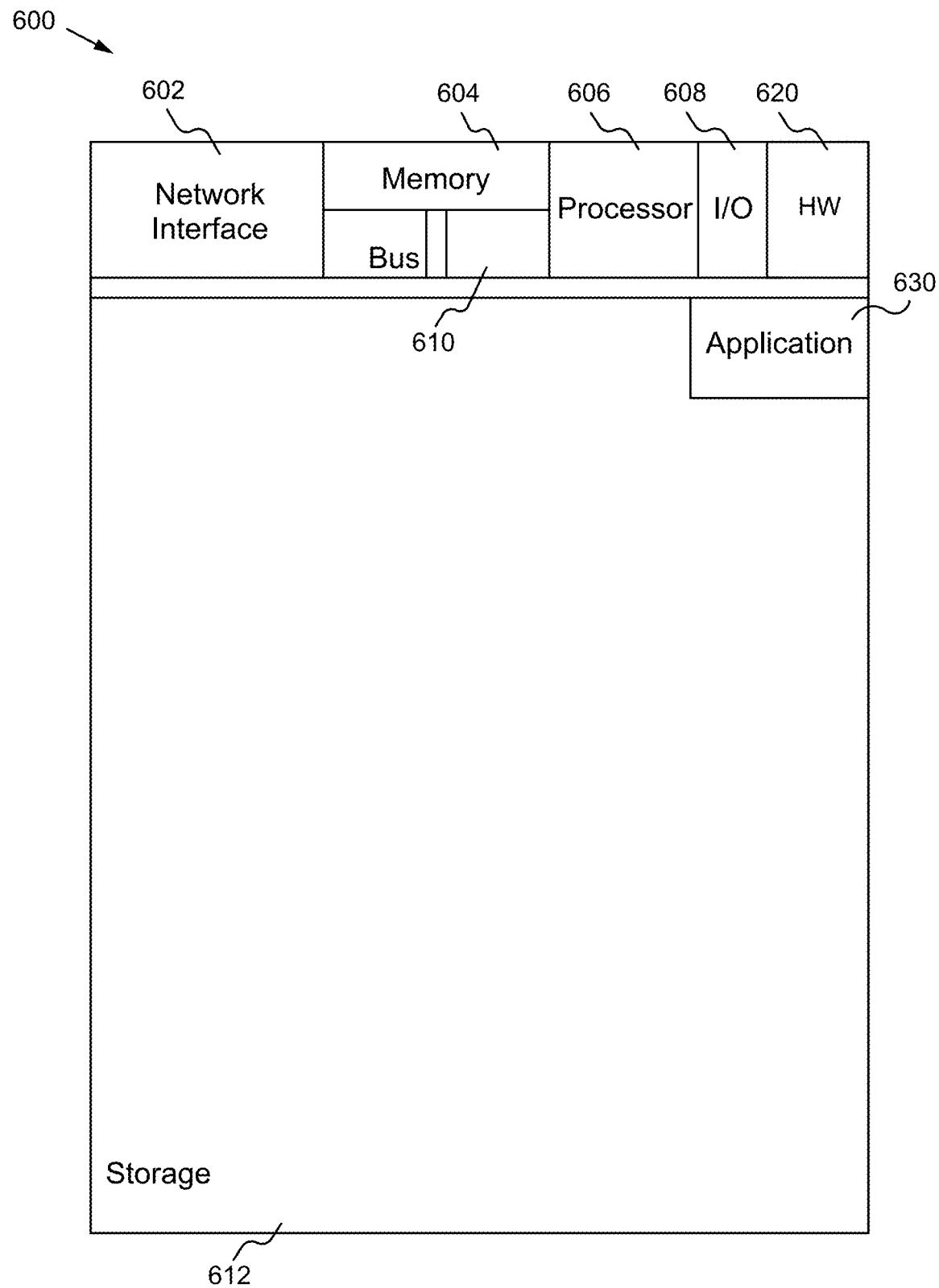
FIG. 6 illustrates a block diagram of an exemplary computing device configured to implement the patch mesh connectivity coding method according to some embodiments.

FIG. 6 illustrates a block diagram of an exemplary computing device configured to implement the patch mesh connectivity coding method according to some embodiments. The computing device 600 is able to be used to acquire, store, compute, process, communicate and/or display information such as images and videos including 3D content. The computing device 600 is able to implement any of the encoding/decoding aspects. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Patch mesh connectivity coding application(s) 630 used to implement the patch mesh connectivity coding implementation are likely to be stored in the storage device 612 and memory 604 and processed as applications are typically processed. More or fewer components shown in FIG. 6 are able to be included in the computing device 600. In some embodiments, patch mesh connectivity coding hardware 620 is included. Although the computing device 600 in FIG. 6 includes applications 630 and hardware 620 for the patch mesh connectivity coding implementation, the patch mesh connectivity coding method is able to be implemented on a computing device in hardware, firmware, software or any combination thereof. For example, in some embodiments, the patch mesh connectivity coding applications 630 are programmed in a memory and executed using a processor. In another example, in some embodiments, the patch mesh connectivity coding hardware 620 is programmed hardware logic including gates specifically designed to implement the patch mesh connectivity coding method.

In some embodiments, the patch mesh connectivity coding application(s) 630 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the patch mesh connectivity coding method, a device acquires or receives 3D content (e.g., point cloud content). The patch mesh connectivity coding method is able to be implemented with user assistance or automatically without user involvement.

In operation, the patch mesh connectivity coding method enables more efficient and more accurate 3D content encoding compared to previous implementations.

Some Embodiments of Patch Mesh Connectivity Coding

1. A method of encoding connectivity information and mapping information comprising:
   encoding vertex mapping information including delta information for geometry correction; and
   encoding patch connectivity information, including implementing mesh simplification by fixing positions of vertices in time.
2. The method of clause 1 further comprising sending a flag indicating whether the vertex mapping information is implicitly or explicitly sent.
3. The method of clause 1 wherein encoding the vertex information and encoding the patch connectivity information are performed by an external encoder.
4. The method of clause 1 wherein encoding the patch connectivity information comprises using color coding in an occupancy map.
5. The method of clause 4 wherein using color coding in the occupancy map is limited to a maximum of 4 colors.
6. The method of clause 1 wherein encoding vertex mapping information further comprises using rate distortion face transmission.
7. The method of clause 1 wherein implementing mesh simplification includes sending only boundary vertices and not sending inner vertices.
8. The method of clause 7 wherein the inner vertices are determined based on a previous set of inner vertices from a previous frame.
9. An apparatus comprising:
   a non-transitory memory for storing an application, the application for:
      encoding vertex mapping information including delta information for geometry correction; and
      encoding patch connectivity information, including implementing mesh simplification by fixing positions of vertices in time; and
   a processor coupled to the memory, the processor configured for processing the application.
10. The apparatus of clause 9 wherein the application is further configured for sending a flag indicating whether the vertex mapping information is implicitly or explicitly sent.
11. The apparatus of clause 9 wherein encoding the vertex information and encoding the patch connectivity information are performed by an external encoder.
12. The apparatus of clause 9 wherein encoding the patch connectivity information comprises using color coding in an occupancy map.
13. The apparatus of clause 12 wherein using color coding in the occupancy map is limited to a maximum of 4 colors.
14. The apparatus of clause 9 wherein encoding vertex mapping information further comprises using rate distortion face transmission.
15. The apparatus of clause 9 wherein implementing mesh simplification includes sending only boundary vertices and not sending inner vertices.
16. The apparatus of clause 15 wherein the inner vertices are determined based on a previous set of inner vertices from a previous frame.
17. A system comprising:
   one or more cameras for acquiring three dimensional content;
   an encoder for encoding the three dimensional content:
      encoding vertex mapping information including delta information for geometry correction; and
      encoding patch connectivity information, including implementing mesh simplification by fixing positions of vertices in time; and
   a decoder for decoding the encoded three dimensional content including:
      using the delta information for adjusting a mesh;
      determining inner vertices of the patch connectivity information from previous inner vertices from a previous frame.
18. The system of clause 17 wherein the encoder is further configured for sending a flag indicating whether the vertex mapping information is implicitly or explicitly sent.
19. The system of clause 17 wherein encoding the vertex information and encoding the patch connectivity information are performed by an external encoder.
20. The system of clause 17 wherein encoding the patch connectivity information comprises using color coding in an occupancy map.
21. The system of clause 20 wherein using color coding in the occupancy map is limited to a maximum of 4 colors.
22. The system of clause 17 wherein encoding vertex mapping information further comprises using rate distortion face transmission.
23. The system of clause 17 wherein implementing mesh simplification includes sending only boundary vertices and not sending inner vertices.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of encoding connectivity information and mapping information comprising:
   encoding vertex mapping information including delta information for geometry correction; and
   encoding patch connectivity information, including implementing mesh simplification by fixing positions of vertices in time, wherein implementing mesh simplification includes sending only boundary vertices and not sending inner vertices, wherein the inner vertices are determined based on a previous set of inner vertices from a previous frame.
2. The method of claim 1 further comprising sending a flag indicating whether the vertex mapping information is implicitly or explicitly sent.
3. The method of claim 1 wherein encoding the vertex information and encoding the patch connectivity information are performed by an external encoder.
4. The method of claim 1 wherein encoding the patch connectivity information comprises using color coding in an occupancy map.
5. The method of claim 4 wherein using color coding in the occupancy map is limited to a maximum of 4 colors.
6. The method of claim 1 wherein encoding vertex mapping information further comprises using rate distortion face transmission.
7. An apparatus comprising:
   a non-transitory memory for storing an application, the application for:
      encoding vertex mapping information including delta information for geometry correction; and encoding patch connectivity information, including implementing mesh simplification by fixing positions of vertices in time, wherein implementing mesh simplification includes sending only boundary vertices and not sending inner vertices, wherein the inner vertices are determined based on a previous set of inner vertices from a previous frame; and a processor coupled to the memory, the processor configured for processing the application.

8. The apparatus of claim 7 wherein the application is further configured for sending a flag indicating whether the vertex mapping information is implicitly or explicitly sent.

9. The apparatus of claim 7 wherein encoding the vertex information and encoding the patch connectivity information are performed by an external encoder.

10. The apparatus of claim 7 wherein encoding the patch connectivity information comprises using color coding in an occupancy map.

11. The apparatus of claim 10 wherein using color coding in the occupancy map is limited to a maximum of 4 colors.

12. The apparatus of claim 7 wherein encoding vertex mapping information further comprises using rate distortion face transmission.

13. A system comprising:

one or more cameras for acquiring three dimensional content;

an encoder for encoding the three dimensional content:
encoding vertex mapping information including delta information for geometry correction; and
encoding patch connectivity information, including implementing mesh simplification by fixing positions of vertices in time, wherein implementing mesh simplification includes sending only boundary vertices and not sending inner vertices; and a decoder for decoding the encoded three dimensional content including:
using the delta information for adjusting a mesh;
determining inner vertices of the patch connectivity information from previous inner vertices from a previous frame.

14. The system of claim 13 wherein the encoder is further configured for sending a flag indicating whether the vertex mapping information is implicitly or explicitly sent.

15. The system of claim 13 wherein encoding the vertex information and encoding the patch connectivity information are performed by an external encoder.

16. The system of claim 13 wherein encoding the patch connectivity information comprises using color coding in an occupancy map.

17. The system of claim 16 wherein using color coding in the occupancy map is limited to a maximum of 4 colors.

18. The system of claim 13 wherein encoding vertex mapping information further comprises using rate distortion face transmission.

* * * * *